US010344792B2

(12) United States Patent
Glickman et al.

(10) Patent No.: US 10,344,792 B2
(45) Date of Patent: Jul. 9, 2019

(54) RECEIVER ASSEMBLY

(71) Applicant: FORD GLOBAL TECHNOLOGIES, LLC, Dearborn, MI (US)

(72) Inventors: David Brian Glickman, Southfield, MI (US); Jeffrey Alan Mesko, Manchester, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 143 days.

(21) Appl. No.: 15/411,570

(22) Filed: Jan. 20, 2017

(65) Prior Publication Data
US 2018/0209463 A1   Jul. 26, 2018

(51) Int. Cl.
*F16B 21/00* (2006.01)
*F16B 21/06* (2006.01)
*B60Q 1/04* (2006.01)
*B60Q 1/26* (2006.01)
*F16B 21/07* (2006.01)
*F16B 5/06* (2006.01)

(52) U.S. Cl.
CPC ............ *F16B 21/06* (2013.01); *B60Q 1/0483* (2013.01); *B60Q 1/263* (2013.01); *F16B 21/073* (2013.01); *F16B 5/065* (2013.01)

(58) Field of Classification Search
CPC ........ F16B 21/073; F16B 21/06; F16B 21/07; F16B 19/1081; F16B 37/0842; F16B 21/075; F16B 21/09; B60Q 1/2642
USPC .......................................................... 411/512
See application file for complete search history.

(56) References Cited

U.S. PATENT DOCUMENTS

| | | | | |
|---|---|---|---|---|
| 2,200,702 A | * | 5/1940 | Oddie | F16B 5/10 292/19 |
| 2,853,113 A | * | 9/1958 | Balint | F16B 21/09 411/103 |
| 4,103,400 A | * | 8/1978 | Munse | B60R 19/445 24/304 |
| 4,707,020 A | * | 11/1987 | Enokida | B62D 27/02 296/187.01 |
| 4,865,505 A | * | 9/1989 | Okada | B60N 3/046 411/512 |
| 5,073,070 A | | 12/1991 | Chang | |
| 5,098,765 A | * | 3/1992 | Bien | B62D 29/048 293/155 |
| 5,129,768 A | | 7/1992 | Hoyle et al. | |
| 5,222,852 A | | 6/1993 | Snyder | |
| 5,533,237 A | * | 7/1996 | Higgins | F16B 5/065 24/289 |
| 5,536,125 A | * | 7/1996 | Gaw, Jr. | F16B 5/0241 411/112 |
| 6,364,586 B1 | | 4/2002 | Okada | |

(Continued)

FOREIGN PATENT DOCUMENTS

WO        2011149952 A1   12/2011

*Primary Examiner* — Gary W Estremsky
(74) *Attorney, Agent, or Firm* — Jason Rogers; Vichit Chea; King & Schickli, PLLC

(57) ABSTRACT

A receiver assembly includes a housing supporting a receiver at least partially within the housing. The receiver includes interior walls forming a cavity accessible through a slot formed in a face of the receiver. First and second lugs extend from the receiver and opposing guide tracks extend from the housing for receiving at least portions of the first and second lugs and limiting movement of the receiver to a first axis within a first plane.

15 Claims, 5 Drawing Sheets

(56) References Cited

U.S. PATENT DOCUMENTS

| | | | | |
|---|---|---|---|---|
| 6,527,471 B2* | 3/2003 | Smith | ............... | F16B 2/20 |
| | | | | 24/293 |
| 6,553,615 B1* | 4/2003 | Hansen | ............... | F16B 5/0241 |
| | | | | 16/2.1 |
| 7,114,221 B2* | 10/2006 | Gibbons | ............... | F16B 5/065 |
| | | | | 24/289 |
| 7,131,806 B2 | 11/2006 | Hansen | | |
| 7,374,200 B2* | 5/2008 | Ikeda | ............... | B60R 21/213 |
| | | | | 280/728.2 |
| 2002/0050551 A1* | 5/2002 | Yamada | ............... | B60N 2/01508 |
| | | | | 248/500 |
| 2006/0117535 A1* | 6/2006 | Fraser | ............... | B60R 13/0206 |
| | | | | 24/289 |
| 2006/0174584 A1* | 8/2006 | Nakazato | ............... | B60N 3/026 |
| | | | | 52/834 |
| 2008/0260454 A1* | 10/2008 | Girodo | ............... | B60R 13/0206 |
| | | | | 403/11 |
| 2008/0260488 A1 | 10/2008 | Scroggie et al. | | |
| 2012/0093610 A1* | 4/2012 | Homner | ............... | F16B 21/073 |
| | | | | 411/347 |
| 2012/0131771 A1* | 5/2012 | Hofmann | ............... | B60N 3/026 |
| | | | | 24/595.1 |
| 2018/0128297 A1* | 5/2018 | Meyers | ............... | F16B 5/0657 |

\* cited by examiner

RECEIVER ASSEMBLY

TECHNICAL FIELD

This document relates generally to a receiver assembly, and more specifically to a receiver that accommodates movement in multiple directions.

BACKGROUND

In the automotive industry, headlamps and tail lamps use ball studs for hidden attachments to support manufacturing and servicing feasibility in areas difficult or impossible to reach. These areas are typically located far from front or rear surfaces where lamps could extend on surfaces along sides of a vehicle. The ball studs, in turn, secure by means of a receiver assembly, or grommet, which allows for both retention and removal, when desired, and are installed into sheet metal or other body panels. In some cases, when the desire is to support certain designs where issues of body variation or craftsmanship dictate the tolerances be held tighter to, or manufacturing ease would be improved if the installation process was initiated at, the inboard side of the lamp, away from the receiver assembly location, the receiver assembly by its current design can be too restrictive to allow for such possibilities.

Accordingly, a need exists for a receiver assembly that accommodates wide variation and/or in-process travel along two axes. Such receiver assemblies may be utilized, for example, in the manufacturing of vehicles.

SUMMARY

In accordance with the purposes and benefits described herein, a receiver assembly is provided. The receiver assembly includes a housing supporting a receiver at least partially within the housing. The receiver includes a face having an opening therein and at least two lugs extending from the receiver. Opposing guide tracks extend from the housing for receiving the at least two lugs and limiting movement of the receiver to a first axis within a plane.

In another possible embodiment, the receiver forms a cavity accessible through the opening. In yet another, the cavity includes upper and lower portions and defines an interior opening narrower than the opening in the face. In still another, the upper portion includes sloping walls extending from the opening in the face toward the interior opening. In one other possible embodiment, the lower portion is bulbous and the interior opening is formed at an intersection of the upper portion and the lower portion.

In another possible embodiment, the opening is a slot extending along a second axis, the second axis being substantially perpendicular to the first axis.

In still another possible embodiment, the at least two lugs are coplanar with the face.

In one other possible embodiment, a receiver assembly includes a housing supporting a receiver at least partially within the housing, the receiver including interior walls forming a cavity accessible through a slot formed in a face of the receiver, first and second lugs extending from the receiver, and opposing guide tracks extending from the housing for receiving at least portions of the first and second lugs and limiting movement of the receiver to a first axis within a first plane.

In another possible embodiment, the slot extends along a second axis within the first plane, the second axis being substantially perpendicular to the first axis.

In yet another possible embodiment, the cavity extends along a second plane including the second axis, the second plane being substantially perpendicular to the first plane.

In still another possible embodiment, the receiver assembly includes at least one tab extending from the housing.

In yet another possible embodiment, the interior walls form a second slot such that an outside width of the first slot formed in the face is larger than an outside width of the second slot.

In yet still another possible embodiment, at least one of the interior walls slopes from the outside width of the first slot to the outside width of the second slot.

In one other possible embodiment, the first and second lugs are coplanar with the face.

A utility vehicle incorporating the receiver assembly of claim 8.

In one other possible embodiment, a receiver assembly includes a housing supporting a receiver at least partially within the housing, the receiver having an opening in a surface thereof, at least two lugs extending from the receiver, and opposing guide tracks extending from the housing for receiving the at least two lugs and limiting movement of the receiver to a first axis within a first plane.

In another possible embodiment, the opening is a slot extending along a second axis within the first plane, the second axis being substantially perpendicular to the first axis.

In still another possible embodiment, the receiver includes interior walls forming a cavity accessible through the slot.

In yet another possible embodiment, the interior walls form a second slot having a smaller outside width than the first slot.

In one other possible embodiment, the receiver assembly includes at least one tab extending from the housing.

In the following description, there are shown and described several preferred embodiments of the receiver assembly. As it should be realized, the receiver assembly is capable of other, different embodiments and its several details are capable of modification in various, obvious aspects all without departing from the methods as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the receiver assembly, and together with the description serve to explain certain principles thereof. In the drawing figures.

Reference will now be made in detail to the present embodiments of the receiver assembly, examples of which are illustrated in the accompanying drawing figures, wherein like numerals are used to represent like elements.

DETAILED DESCRIPTION

Figure 1:
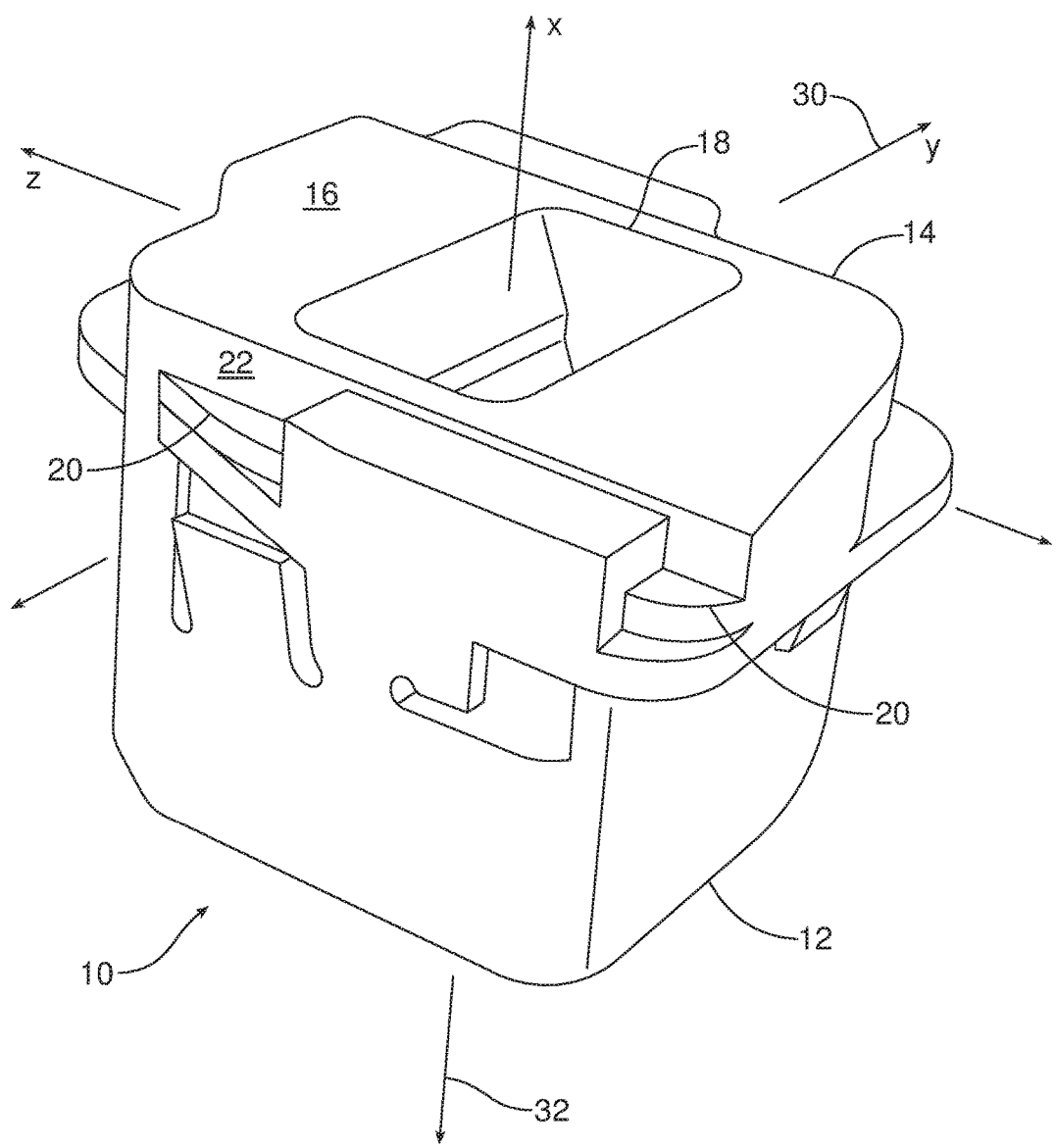
FIG. 1 is a perspective view of a receiver assembly.

Reference is now made to FIG. 1, which broadly illustrates a perspective view of a receiver assembly 10. The receiver assembly 10 includes a housing 12 supporting a receiver 14. The receiver 14 includes a face 16 defining an opening 18 therein. In the described embodiment, a pair of lugs 20 extend from left and right sides 22, 24, respectively, of the receiver 14. In alternate embodiments, the lugs 20 may also be coplanar with the face 16. Corresponding guide tracks 26 extend from the housing 12 for receiving the pair of lugs 20. The guide tracks 26 are designed to contact at least portions of the pair of lugs 20 so as to limit movement of the receiver 14 along or to a first axis 28. Of course, the guide tracks 26 could extend the entirety of the length of the pair of lugs 20 in alternate embodiments.

In other words, the receiver 14 is prevented from moving in either a Y-direction along a second axis 30 or in an X-direction along a third axis 32. Housing 12 prevents movement along the third axis 32 through contact between the receiver 14 and the housing and the receiver and the guide tracks. Similarly, the guide tracks 26 prevent movement along the second axis 30 through contact between the receiver 14 and the guide tracks. As intended, the receiver 14 and guide tracks 26 accommodate movement along the first axis 28 within a first plane. The first plane is defined by the first axis 28 and the second axis 30.

In the described embodiment, however, the guide tracks 26 and/or the pair of lugs 20 are designed such that a certain amount of friction exists between the components during movement along the first axis 28 requiring a certain level of force to move the receiver 14. The tolerance and material selection by which the housing 12 and receiver 14 are manufactured and held together allow for smooth and precise movement of the receiver relative the base.

Figure 2:
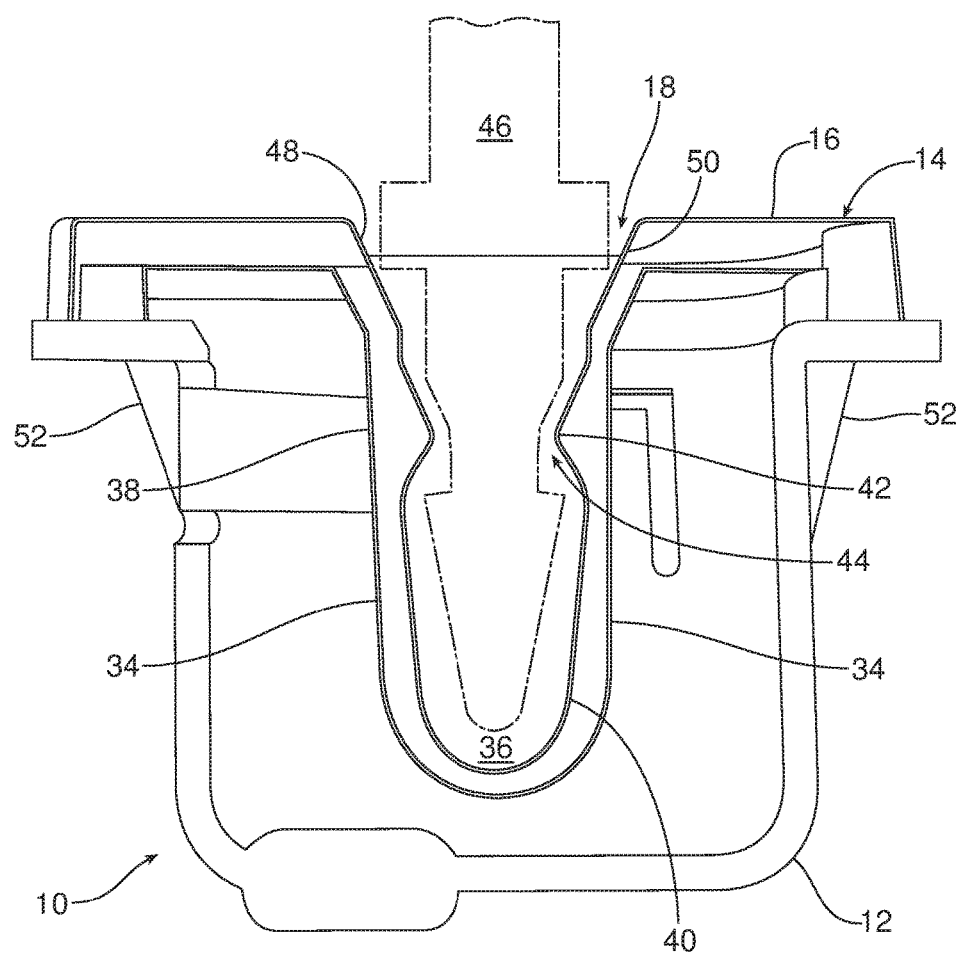
FIG. 2 is a cross section view of the receiver assembly taken along a first axis.
Figure 3:
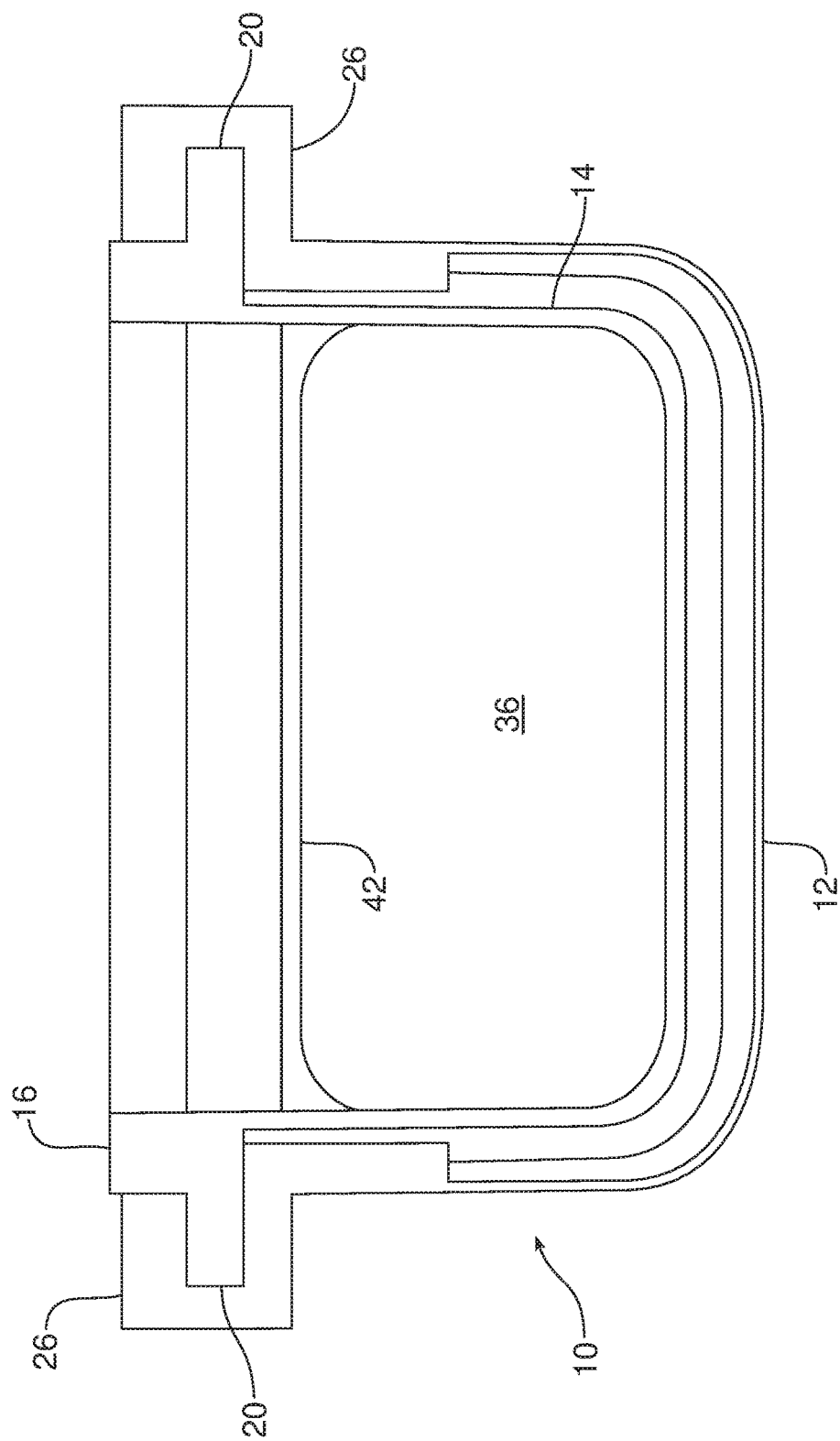
FIG. 3 is a cross sectional view of the receiver assembly taken along a second axis.

As shown in FIG. 2, the receiver 14 is supported such that a portion of the receiver resides within the housing 12. The receiver 14 includes interior walls 34 that form a cavity 36. The cavity 36 is accessible through the opening 18 of receiver face 16. In the described embodiment, the cavity 36 includes upper and lower portions 38, 40 which intersect or come together forming a ridge 42 that defines an interior opening 44. As shown, the interior opening 44 is narrower than the opening 18 in the face 16. The opening 18 is designed to receive a ball stud 46 (shown in dashed line) or the like and to loosely retain or capture the ball stud. The ridge 42 is designed to hinder removal of the ball stud 46 while allowing for removal when desired.

In order to form the narrower opening, the upper portion 38 of the cavity 36 includes sloping walls 48, 50 extending from the opening 18 toward the interior opening or ridge 42. While a bulbous lower portion 40 is shown in the described embodiment, the cavity 36 may take any form including an open lower portion. In addition, one or more tabs 52 extends from the housing 12 in order to orient the receiver assembly 10. In other words, the tabs 52 may be formed on an exterior of the housing 12.

As best shown in FIG. 1, the opening 18 is generally shaped like a slot in the described embodiment. The slot 18 extends along the second axis 30 which is substantially perpendicular to the first axis 28. Utilizing a slot 18 allows the ball stud 46 to move a limited amount in the Y-direction along the second axis 30 in addition to movement in the Z-axis along the first axis 28.

Figure 4:
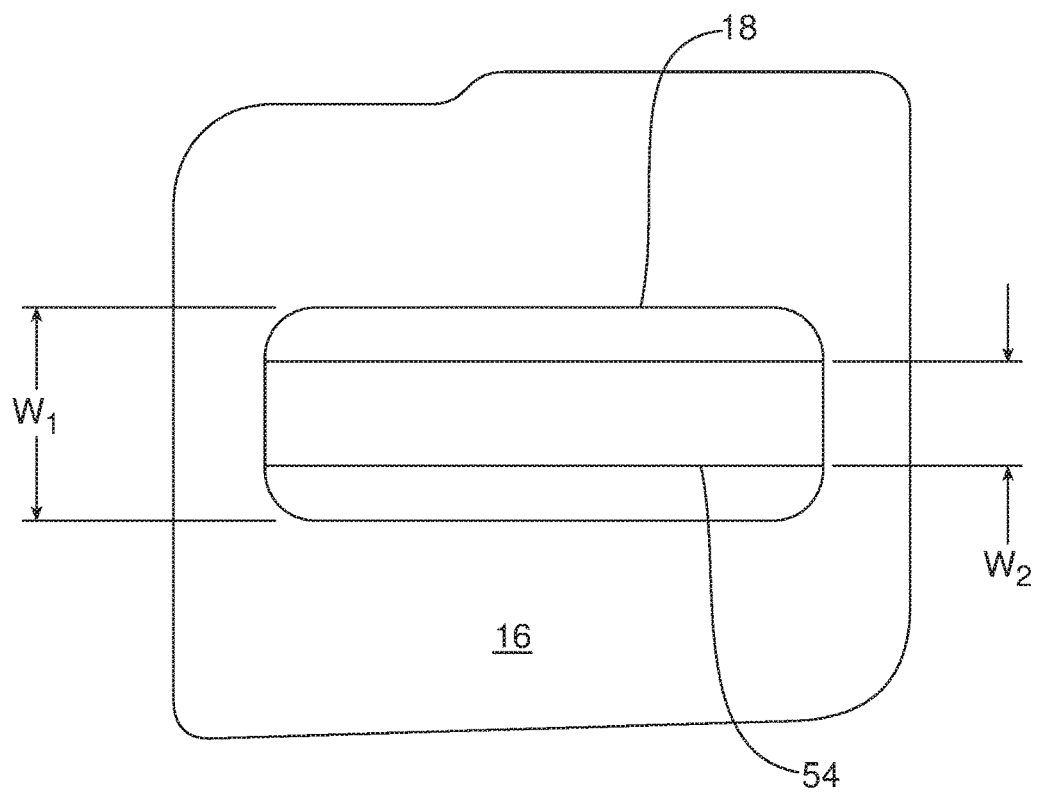
FIG. 4 is a top plan view of the receiver showing outside widths (W) of the first and second slots.

Similarly, the cavity 36 extends along a second plane that is substantially perpendicular to the first plane and includes the second axis 30. In the described embodiment, the interior walls form a second slot 54. As shown in FIG. 4, an outside width ($W_1$) of the first slot 18 formed in the face 16 is larger than an outside width ($W_2$) of the second slot 54.

Figure 5:
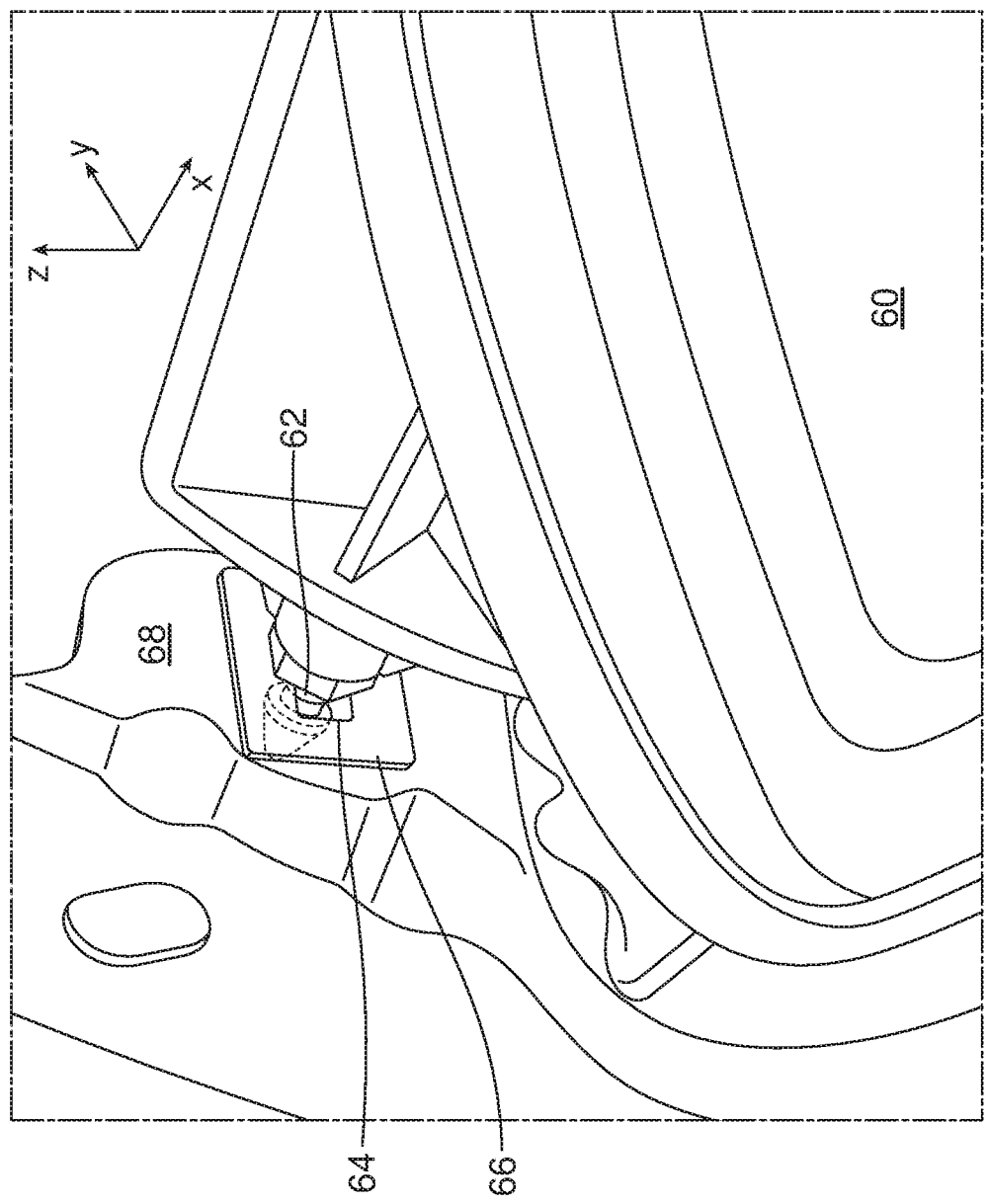
FIG. 5 is a partial perspective view of a receiver assembly supported by a fender receiving a ball stud extending from a headlight assembly during assembly.

As shown in FIG. 5, the receiver assembly 10 described above may, in additional to other uses, be utilized in and form a part of a utility vehicle (e.g., cars, pick-up trucks, mini-vans, sport utility vehicles, vans, and various types of trucks, etc.). As shown, a headlight assembly 60 may include a ball stud 62 for locating hidden attachments to support manufacturing and servicing feasibility in areas difficult or impossible to reach. In this instance, the ball stud 62 extends from a rear of the headlight assembly 60 and is inserted into a slot 64 of a receiver assembly 66, as described above, which itself is positioned in a fender 68 of a vehicle (not shown). In this manner, the headlight assembly 60 is supported relative the fender 68 such that movement of the headlight assembly is restricted in the X-axis direction.

In such an arrangement, the headlight assembly 60 is free to move in the Y-axis direction and the Z-axis direction while supported and prior to attachment to the vehicle. In this manner, the headlight assembly 60 may be moved prior to joining another component (e.g., a vehicle grille or fender) in a manner that establishes a consistent margin or gap width and/or flushness therebetween. As noted above, the tolerance and material selection by which a housing and receiver of the receiver assembly 66 are manufactured and held together allow for smooth and precise movement of the receiver relative the housing, and help to ensure that the headlight assembly 60 can be installed under a greater variety of conditions while maintaining a desired craftsmanship or manufacturing strategy.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. A receiver assembly comprising:
    a housing supporting a receiver at least partially within said housing, said receiver including a face having an opening therein, at least two lugs extending from said receiver and a cavity accessible through the opening wherein the cavity includes upper and lower portions and defines an interior opening narrower than the opening in said face and wherein said lower portion is bulbous and the interior opening is formed at an intersection of said upper portion and said lower portion; and
    opposing guide tracks extending from said housing receive said at least two lugs and limit movement of said receiver to a first axis within a first plane parallel to a second plane defined by the face.

2. The receiver assembly of claim 1, wherein said upper portion includes sloping walls extending from the opening in said face toward the interior opening.

3. The receiver assembly of claim 1, wherein the opening is a slot extending along a second axis, the second axis being substantially perpendicular to the first axis.

4. The receiver assembly of claim 1, wherein at least two lugs are coplanar with said face.

5. A receiver assembly comprising:
a housing supporting a receiver at least partially within said housing, said receiver including interior walls forming a cavity accessible through a first slot formed in a face of said receiver;
first and second lugs extending from said receiver; and
opposing guide tracks extending from said housing, each of said opposing guide tracks contacting three sides of one of at least portions of said first and second lugs limiting movement of said receiver to a first axis within a first plane and wherein the first slot extends along a second axis, the second axis being substantially perpendicular to the first axis.

6. The receiver assembly of claim 5, wherein the cavity extends along a second plane including the second axis, the second plane being substantially perpendicular to the first plane.

7. The receiver assembly of claim 6, further comprising at least one tab extending from said housing.

8. The receiver assembly of claim 5, wherein said interior walls form a second slot, an outside width of the first slot formed in said face being larger than an outside width of the second slot.

9. The receiver assembly of claim 8, wherein at least one of said interior walls slopes from the outside width of the first slot to the outside width of the second slot.

10. The receiver assembly of claim 5, wherein said first and second lugs are coplanar with said face.

11. A utility vehicle incorporating the receiver assembly of claim 5.

12. A receiver assembly comprising:
a housing supporting a receiver at least partially within said housing, said receiver having an opening in a surface thereof;
at least two lugs extending from said receiver; and
opposing guide tracks extending from said housing receive said at least two lugs and limit movement of said receiver to a first axis within a first plane substantially parallel to a second plane defined by a face of the receiver and wherein the opening is a slot extending along a second axis, the second axis being substantially perpendicular to the first axis.

13. The receiver assembly of claim 12, wherein said receiver includes interior walls forming a cavity accessible through the slot.

14. The receiver assembly of claim 13, wherein said interior walls form a second slot having a smaller outside width than an outside width of the first slot.

15. The receiver assembly of claim 14, further comprising at least one tab extending from said housing.

* * * * *